Dec. 25, 1928.

E. M. SCOVILLE 1,696,735

OIL FILTER

Filed May 24, 1923     3 Sheets-Sheet 1

Inventor
E. M. Scoville
by W. H. Lieber
Attorney

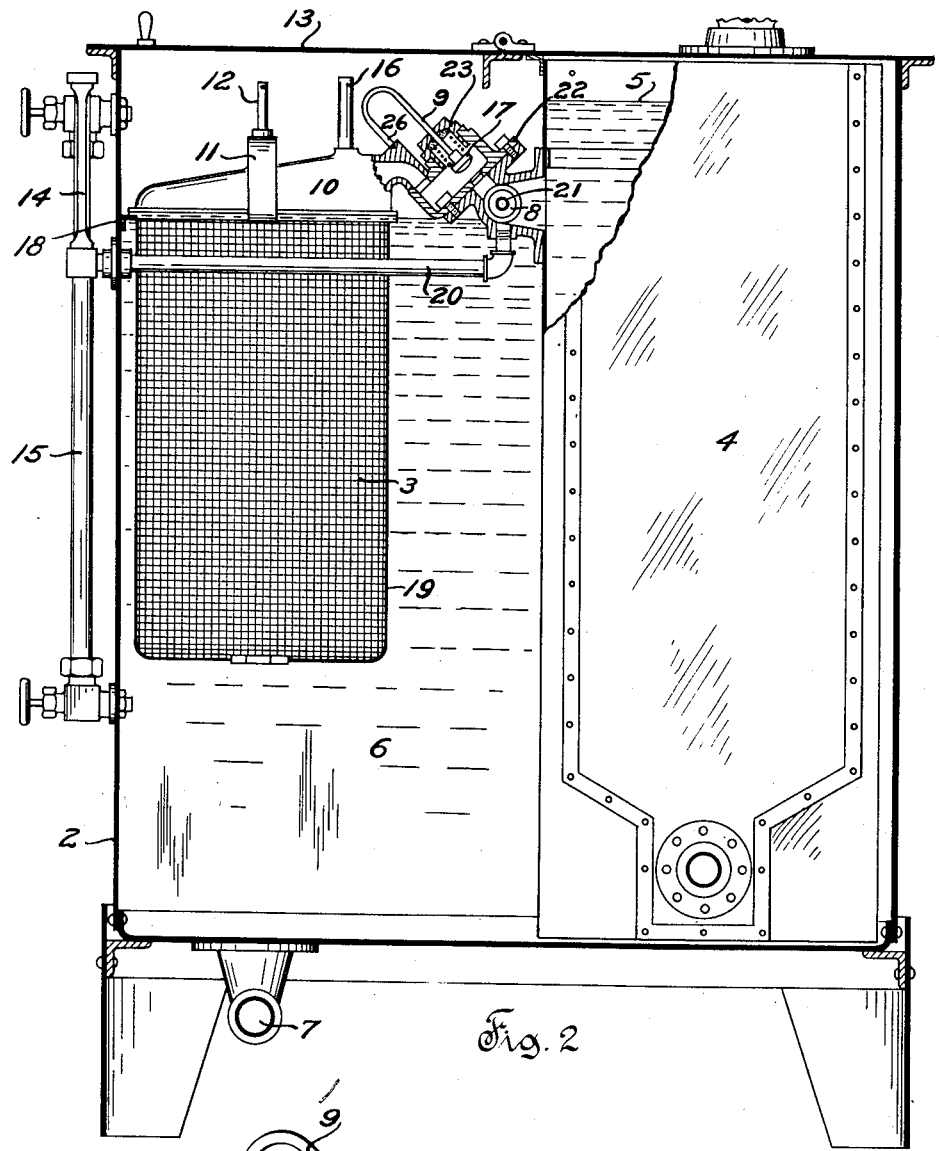

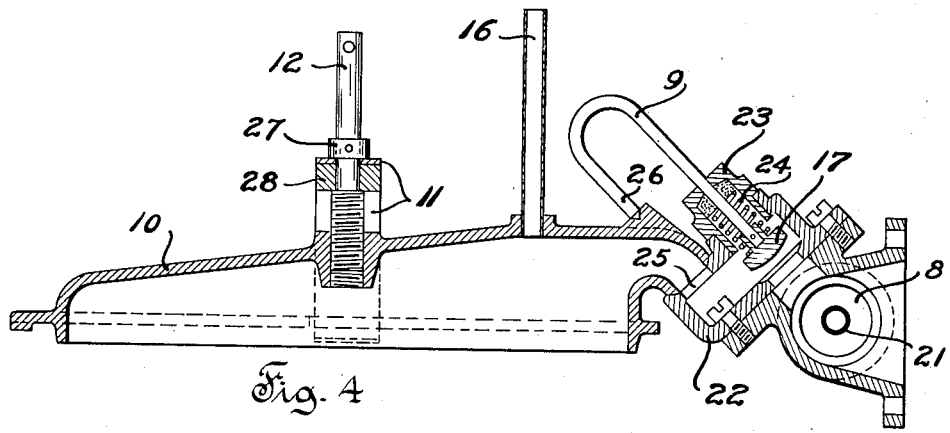
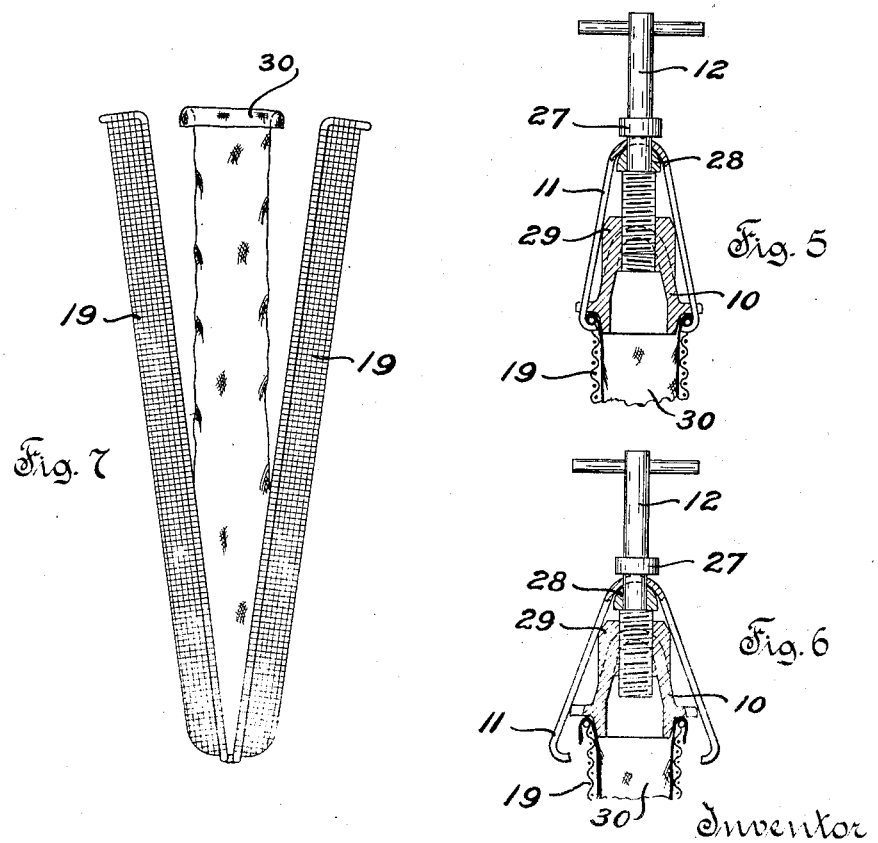

Patented Dec. 25, 1928.

1,696,735

UNITED STATES PATENT OFFICE.

EUGENE M. SCOVILLE, OF MILWAUKEE, WISCONSIN, ASSIGNOR OF ONE-HALF TO FLOYD L. SWANBERG, OF DANVILLE, ILLINOIS.

OIL FILTER.

Application filed May 24, 1923. Serial No. 641,075.

This invention relates in general to improvements in the art of purifying or clarifying liquids, and relates more specifically to improvements in the construction and operation of cell filters especially adapted for the automatic treatment of fluids such as lubricating oil.

A general object of the invention is to provide a liquid filtering device which is simple in construction and efficient in operation.

Several of the more important specific objects and advantages of the present invention are as follows:—

To provide a compact filtering unit of relatively large capacity, which may be manufactured at minimum cost.

To provide a liquid filtering device which is entirely automatic in operation and the capacity of which may be readily varied.

To provide a cellular filter in which the cost of maintenance is a minimum, and in which any one or more of the cells may be removed wihout interfering with the normal operation of the others.

To provide an extremely simple and compact filter cell structure which may be conveniently inserted in or removed from a filter unit for cleaning or inspection.

To provide efficient means for readily indicating the condition of the filtering medium, and for effecting removal of the medium from the filter cells.

To provide a filter which is especially adapted to operate in conjunction with automatic lubricating oil purifiers and rectifiers.

These and other objects and advantages will be apparent in the course of the following description.

Some of the novel features of oil rectifiers and purifiers disclosed herein, are claimed in copending application Serial Number 592,-204, filed October 4, 1922, of which the present invention is a continuation in part.

A clear conception of embodiments of the several features of the present invention and of the operation of filtering devices constructed in accordance therewith, may be had by referring to the drawings accompanying and forming part of this specification, in which like reference characters designate the same or similar parts in the various views.

Fig. 2 is a vertical section through the main casing of the oil purifying unit, showing details of construction of the filtering section.

Fig. 3 is an enlarged transverse vertical section through the filter supply header and one of the valve casings, showing the cell supply valve in closed position.

Fig. 4 is an enlarged transverse vertical section through the filter supply header, one of the valve casings, and a cell support, showing the elements in normal filtering position.

Fig. 5 is an enlarged vertical section through one of the cell supports showing fragments of a filter sack and its retainer clamped in normal filtering position.

Fig. 6 is an enlarged vertical section through one of the cell supports showing fragments of a filter sack and its retainer released from the support.

Fig. 7 is an enlarged end view of one of the filter sacks showing its retainer sections spread apart preparatory to removal of the sack.

Figure 1:
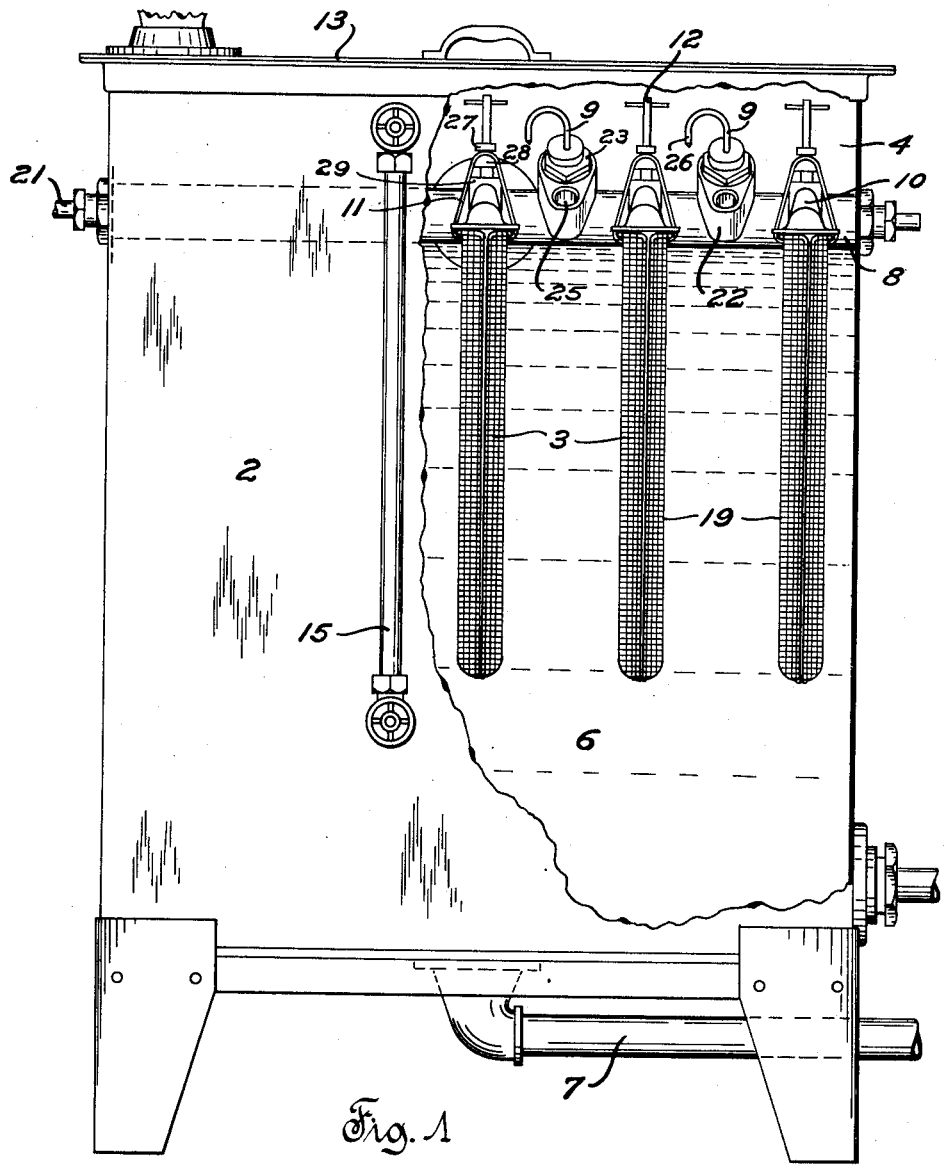
Fig. 1 is an end view of an oil purifying unit, a part of the main casing having been broken away in order to clearly illustrate the construction of the filtering section of the unit.

The improved oil purifying unit comprises generally a gravity separating section 4 and a filtering section, both of these sections being housed within a common main casing 2, see Fig. 2. The impure oil is admitted to the gravity separating section of the unit and is initially rectified therein as fully described in the copending application above referred to. The filtering section to which the present invention relates, comprises a plurality of filter cells 3, means for conducting the partially rectified oil 5 from the gravity separating section 4 to the cells 3, and a collecting chamber for housing the cells 3 and for collecting the finally purified oil 6 delivered from the filter cells 3.

Each of the filter cells 3 comprises a support 10 having a liquid conducting conduit therein, a two part wire sack retainer 19 associated with the support 10, a flexible fabric filter sack 30 located within the retainer 19 and communicating with the supply conduit in the support 10, and means for detachably connecting the retainer 19 and the sack 30 to the support 10. Each cell support 10 is provided with a cell condition indicator or riser 16 having an open upper end and providing a vertical conduit communicating with the interior of the support 10, see Fig. 4. The front portion of each cell support 10 is provided with a projection adapted to rest upon a supporting ledge 18 secured to the casing 2 in order to hold the support 10 in substantially horizontal normal position. The rear portion of each cell support 10 is provided with a spherical seat adapted to rest within any one of a series of spherical sockets 25 of the valve casings 22.

As clearly disclosed in Fig. 7, each of the wire filter sack retainers 19 comprises two sections which are pivotally united at the bottom and which are separable at the top, these sections when folded together providing a cage for housing the sack 30. The sacks 30 are preferably made of suitable filtering medium such as cotton fabric, and are of length somewhat greater than the cage 19 in order to permit lapping of the upper edges of the sack over the upper edges of the retainer 19. The upper open ends of the sacks 30 are in open communication with the liquid supply conduits formed in the supports 10.

The means for detachably connecting the retainer 19 and the sack 30 to the support 10 of each filter cell 3 comprises an inverted U-shaped leaf spring 11 having hooked lower ends, a vertically adjustable clamping rod 12 having screw thread coaction with a medial portion of the support 10, a collar 27 and knuckle 28 cooperable with opposite sides of the spring 11, and a pair of spring spreading abutments 29 formed integral with the support 10, see Figs. 4, 5 and 6. The lower hooked ends of the spring 11 are adapted to engage the retainer 19 and sack 30 as indicated in Fig. 5, in order to firmly unite the retainer 19, the sack 30 and the support 10.

The means for conducting the partially rectified oil 5 from the gravity separating section 4 to the filter cells 3, comprises a horizontal header 8 having a heating coil 21 therein, a series of equally spaced detachable valve boxes 22 providing means of communication from the header 8 to the individual cells 3, and a valve 17 for controlling the delivery of liquid through each of the boxes 22, see Figs. 3 and 4. Each valve 17 is provided with a valve stem 9 having a cell retaining reversed portion 26, and is urged towards its seat by means of a helical compression spring 24. The valves 17 and springs 24 are readily insertible in and removable from the boxes 22 by virtue of the removable valve caps 23 which also afford means for varying the tension of the springs 24. When a cell 3 is associated with a valve box 22 as shown in Fig. 4, the rear end of the support 10 is held firmly against the adjacent spherical seating 25 by the spring 24 and the valve stem 9, the reversed portion 26 of which engages a socket in the support 10. With the elements thus positioned, the valve 17 is held open as indicated and oil 5 is free to gravitate from the header 8 through the valve box 22 and into the cell 3. When the cell 3 is removed from the valve box 22 and the valve stem 9 is released, the valve 17 is forced against its seat and prevents delivery of oil 5 from the header 8 to the valve box 22. The valve rods or stems 9 are rotatable about the axes of the valves 17 in order to facilitate insertion and removal of the filter cells 3.

The header 8 is preferably connected with a gage 14 located at the front of the unit by means of a pipe 20 which passes through the space between adjacent cells 3, see Fig. 2. This gage 14 indicates the level of the oil 5 in the gravity separating section 4. The filtering section is also provided with a gage 15 located at the front of the unit, for indicating the height of the purified oil 6. The filtering section is also provided with a discharge pipe 7 for effecting delivery of purified oil 6. Access to the interior of the filtering section is effected by means of a cover 13 shown in Figs. 1 and 2.

During normal operation of the purifying unit, the gravity separating section 4 is receiving impure oil and is continuously delivering the partially purified oil 5 by gravity into the header 8. A desirable number of filter cells 3 are associated with the header 8 in the manner shown in Figs. 1, 2 and 4, and partially purified oil 5 is permitted to gravitate from the header 8 through the valve boxes 22 into the interior of the cells 3. The oil then flows through the filter sacks 30 and is purified, the pure oil 6 passing into the space surrounding the cells 3 and the impurities remaining within the sacks 30. The purified oil 6 is drawn off as desired through the discharge pipe 7. In this manner, the oil is automatically and continuously purified and delivered from the unit.

The capacity of the filtering section may be readily varied by inserting or removing filter cells 3, the cells being conveniently insertible and removable through the door 13. As the removed impurities collect within the sacks 30 and clog the filtering orifices, the liquid rises within the cells and eventually becomes visible at the risers 16. When the filtering medium of a cell 3 becomes congested as indicated by rising of the liquid in its riser 16, the congested cell 3 may be removed by releasing the valve stem portion 26 normally holding the cell in position, and lifting the cell vertically from the filtering chamber. The retainer 19 and sack 30 may then be released from the cell support 10 by moving the clamping rod 12 to the position shown in Fig. 6. With the elements thus released, the retainer sections may be readily separated and the congested sack 30 removed and cleaned. In order to assemble a cell 3, it is only necessary to insert a sack 30 as shown in Fig. 7, to close the retainer 19 and to move the clamping rod 12 to adjust the spring 11 to the position shown in Fig. 5. During clamping and release of the retainers 19 and of the sacks 30, the collar 27 and knuckle 28 function to urge the spring 11 either toward or away from the adjacent support 10 when the rod 12 is rotated. The abutments 29 serve to spread the spring arms when the elements are being released, as shown in Fig. 6. It will thus be observed that the filter cells 3 are conveniently removable and insertible and that the filtering medium or sacks 30 may be readily romoved for cleaning and subsequently reinserted.

The retainers 19 serve to prevent undesirable bulging of the sacks 30 as impurities accumulate therein, and serve to protect the sacks and to maintain constant distances between adjacent cells 3. The risers 16 constitute simple and efficient means for indicating the condition of the filtering medium and the gages 14, 15 serve to indicate the normal condition of operation of the unit. The heating coil 21 may be utilized to maintain the oil in fluent condition and the valves 17 may be removed when necessary by virtue of the valve caps 23. The entire unit may be manufactured at moderate cost and is highly efficient and flexible in operation.

It should be understood that it is not desired to limit the invention to the exact details of construction and operation herein shown and described for various modifications within the scope of the claims may occur to persons skilled in the art.

It is claimed and desired to secure by Letters Patent:—

1. In a combination, a support, a divided perforated rigid sack retainer detachably connected to said support, and a flexible sack located within said retainer and removable therefrom by separation of said retainer divisions.

2. In combination, a support, a divided wire sack retainer coacting with opposite sides of said support, a sack located within said retainer and removable therefrom by separation of said retainer divisions, and means for deachably clamping said retainer and said sack against said support.

3. In combination, a support, a longitudinally divided wire sack retainer detachably connected to said support, and a fabric sack located within said retainer and removable therefrom by separation of said retainer divisions.

4. In combination, an elongated support, a longitudinally divided wire sack retainer detachably connected to the elongated sides of said support, a fabric sack located within said retainer and removable therefrom by separation of said retainer divisions, and means for simultaneously clamping the opposite sides of said retainer and of said sack to the elongated sides of said support.

5. In combination, a support, a filter cell, a single spring for clamping said cell against opposite sides of said support, and means mounted upon said support for releasing said cell by distorting said spring.

6. In combination, a sack retainer comprising two sections pivotally united at the bottom and separable at the top, a filter sack within said retainer, and common means for uniting said retainer and said sack and for preventing separation of said sections.

7. In combination, a support, a sack retainer comprising two sections separable at the top, a filter sack within said retainer, and common means associated with said support for uniting said retainer and said sack and for preventing separation of said sections.

8. In combination, a support, a filter cell coacting with said support, a spring having hooked ends for holding said cell against said support, and means coacting with said support and with said spring for forcing said spring into engagement with said cell.

9. In combination, a support, a filter cell, and means for detachably connecting said support and said cell, said means comprising a bifurcated element bridging said support and means for distorting said element.

10. In combination, a source of liquid supply, a header communicating with said source and located below the liquid level in said source, a plurality of filter cells communicating with said header, means for effecting removal of said cells from said header and for preventing escape of liquid at the point of removal, and a riser for each of said cells extending above said header.

11. In combination, a liquid supply header, a plurality of filter cells detachably communicable with said header, means for effecting removal of said cells from said header and for preventing escape of liquid at the point of removal, and a riser secured to and communicating with the interior of each of said cells and extending above the liquid in said header.

In testimony whereof, the signature of the inventor is affixed hereto.

EUGENE M. SCOVILLE.